(12) United States Patent
Abraham et al.

(10) Patent No.: US 12,128,642 B2
(45) Date of Patent: Oct. 29, 2024

(54) CO-MOLDED OPTICAL LENSES AND METHODS AND DEVICES FOR FORMING SAME

(71) Applicant: REVISION MILITARY LTD., Essex Junction, VT (US)

(72) Inventors: Shaun Abraham, Waterbury, VT (US); Garth Blocher, Milton, VT (US); Oliver Pentenrieder, Grand Isle, VT (US); Robert Rixie, Essex Junction, VT (US)

(73) Assignee: Revision Military Ltd., Essex Junction, VT (US)

( * ) Notice: Subject to any disclaimer, the term of this patent is extended or adjusted under 35 U.S.C. 154(b) by 0 days.

(21) Appl. No.: 17/672,480

(22) Filed: Feb. 15, 2022

(65) Prior Publication Data

US 2022/0258441 A1 Aug. 18, 2022

Related U.S. Application Data

(60) Provisional application No. 63/149,499, filed on Feb. 15, 2021.

(51) Int. Cl.
*B29C 45/16* (2006.01)
*B29D 11/00* (2006.01)

(52) U.S. Cl.
CPC .... *B29D 11/00403* (2013.01); *B29C 45/1615* (2013.01); *B29D 11/0048* (2013.01)

(58) Field of Classification Search
CPC .......... B29D 11/00403; B29D 11/0048; B29C 45/1615
See application file for complete search history.

(56) References Cited

U.S. PATENT DOCUMENTS

| | | | |
|---|---|---|---|
| 6,634,877 B2 | 10/2003 | Silicia et al. | |
| 7,662,318 B2 | 2/2010 | Jiang et al. | |
| 7,820,081 B2 | 10/2010 | Chiu et al. | |
| 8,651,660 B2 | 2/2014 | Barzak et al. | |
| 10,901,167 B1 * | 1/2021 | Courter, Jr. | B29C 45/0025 |
| 2011/0319977 A1 * | 12/2011 | Pandelidis | C22F 1/06 |
| | | | 623/1.42 |
| 2015/0102513 A1 * | 4/2015 | Hou | B29C 45/162 |
| | | | 264/1.7 |
| 2017/0341282 A1 | 11/2017 | Krallmann | |

OTHER PUBLICATIONS

Thermal bonding of PMMA: effect of polymer molecular weight, Microsyst Technol (2010) 16:487-491 Nimai C. Nayak (Year: 2010).*
Multi-Component Molding: Which Way Should You Go?, Plastics Technology, John Berg, May 21, 2014 (Year: 2014).*
The Mechanical Strength of a Mechanical Bond: Sonochemical Polymer Mechanochemistry of Poly(catenane) Copolymers, Angewandte Chemie Bobin Lee (Year: 2016).*
Marrying Lens to Frame: The State of the Art in 2018, Milling Edgers: Reinventing the Wheel, 20/20 magazine, by Barry Santini (Year: 2018).*

* cited by examiner

*Primary Examiner* — Alison L Hindenlang
*Assistant Examiner* — Erica Hartsell Funk
(74) *Attorney, Agent, or Firm* — Armstrong Teasdale LLP

(57) ABSTRACT

Described herein is method of co-molding an optical lens includes injection-molding a first layer, injection-molding a second layer against at least a portion of the molded first layer to form a co-molded blank, and forming the optical lens from the co-molded blank. Co-molding apparatuses for implementing this and other co-molding methods are also described.

12 Claims, 13 Drawing Sheets

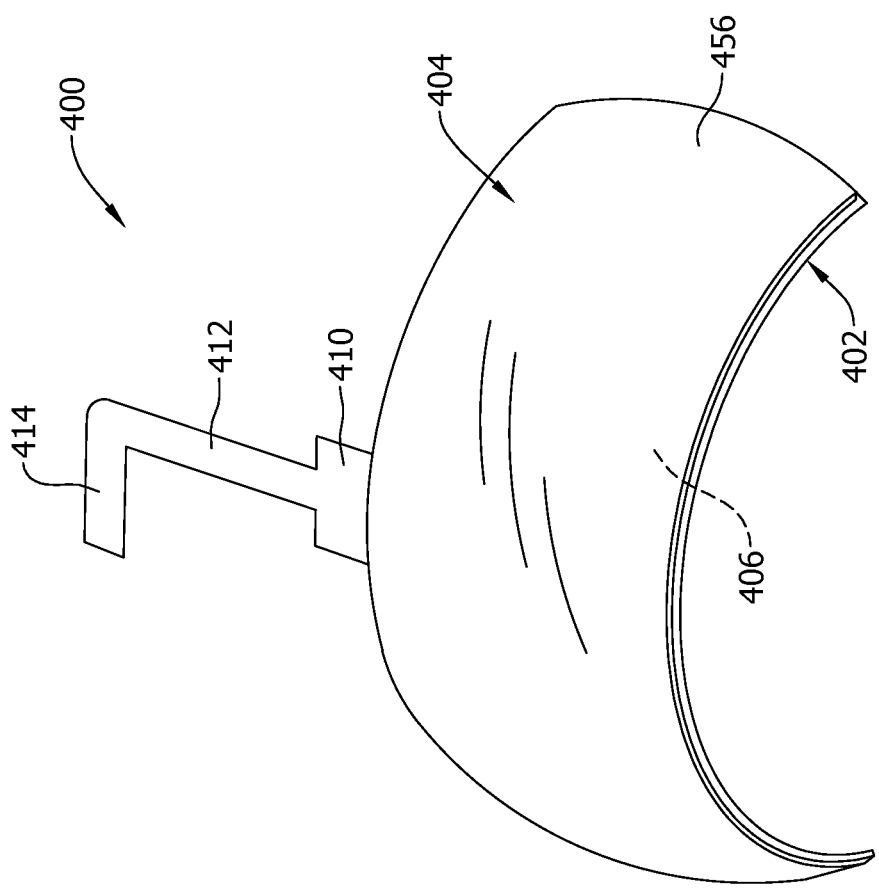

CO-MOLDED OPTICAL LENSES AND METHODS AND DEVICES FOR FORMING SAME

CROSS-REFERENCE TO RELATED APPLICATIONS

This application is a Non-Provisional Application of and claims the benefit priority to U.S. Provisional Patent Application No. 63/149,499, filed Feb. 15, 2021, which is incorporated by reference herein in its entirety.

BACKGROUND

This disclosure relates generally to optical lenses and, more particularly, to co-molded optical lenses and methods and devices for forming the same.

In the field of protective eyewear and lenses, there are a limited variety of lens construction methods. These construction methods generally fall into one of following categories: grinding, casting, or injection molding. In addition, where thin layers are to be added to a (constructed) optical lens, these layers may be applied using techniques such as dip coating or flow-coating, or films may be molded or applied directly to a lens surface with an adhesive. If a lens with thicker multi-layer elements is desired, there is generally only one process utilized, namely, adhering different layers to one another. Unfortunately, this technique is prohibitively expensive for most applications, and the resulting lenses frequently are not very robust or are of poor quality.

Moreover, optical lenses with particular characteristics—such as abrasion resistance, chemical resistance, laser protection, or projectile protection—are desired. There is therefore a need for lens construction techniques that enable these characteristics while balancing quality and cost priorities.

BRIEF DESCRIPTION

In one aspect, the present disclosure is directed to a method of co-molding an optical lens. The method includes injection-molding a first layer, injection-molding a second layer against at least a portion of the molded first layer to form a co-molded blank, and forming the optical lens from the co-molded blank.

In another aspect, the present disclosure is directed to a co-molding apparatus. The co-molding apparatus includes a head having a first molding station and a second molding station. The first molding station includes a first mold for forming a first layer of a co-molded part therein, the first mold defined by a first mold plate and a second mold plate. The second molding station includes a second mold for forming a second layer of the co-molded part against at least a portion of the molded first layer. The co-molding apparatus also includes an actuator coupled to the second mold plate.

In yet another aspect, the present disclosure is directed to a co-molding apparatus. The co-molding apparatus includes a first mold plate and a second mold plate. A first mold is at least partially defined between the first mold plate and the second mold plate, for forming a first layer of a co-molded part. The first mold plate has a body protrusion, and the second mold plate has defined therein a body channel complementary to the body protrusion and an overmold flange channel extending circumferentially around the body channel.

BRIEF DESCRIPTION OF THE DRAWINGS

FIG. 6 depicts another exemplary co-molded blank.

DETAILED DESCRIPTION

The present disclosure is directed to co-molded optical lenses and methods of forming the same. The concept of co-molding in injection molding refers to initiating multiple discrete material injections, to form a same molded part (e.g., an optical lens). The present disclosure provides co-molding methods and molding tools to form optical lens structures with improved optical quality layers, as well as improved ballistic protection.

In general, a "gate" refers to an opening or entrance into an injection mold cavity, through which molten material (e.g., polymeric resin) is injected. The channels of the mold cavity are referred to as "runners." A "shot" refers to the injection material used to form an entire discrete injection-molded layer of a molded part. A "base" or "base layer" refers to a first or initial shot or layer. Subsequent shots or layers may be referred to as "caps" or "cap layers."

There exist various quality concerns when producing an optical lens using any construction method. Quality concerns specific to molding methods include, for example, accurate optical properties, such that the molded optical lens will exhibit proper optical function, and desired physical dimensions, such that the optical lens suits its desired physical function (e.g., a two-lens eyeglass apparatus, a single-lens eyeglass apparatus, etc.). Therefore, the molding apparatus must be designed with suitable gate, runner, and other molding features to allow each shot to be molded without interfering with features of previous or following shots. In addition, the molding apparatus must be designed with suitable control of timing, pressures (e.g., molding pressures, clamp pressures, etc.), and other molding parameters, to ensure shots will flow into the desired shapes for the intended function of the resultant optical lens. Accordingly, both the method and apparatus for co-molding optical lenses are important to facilitate accurate, precise, and cost-effective construction of the desired resultant optical lenses.

Figure 1:
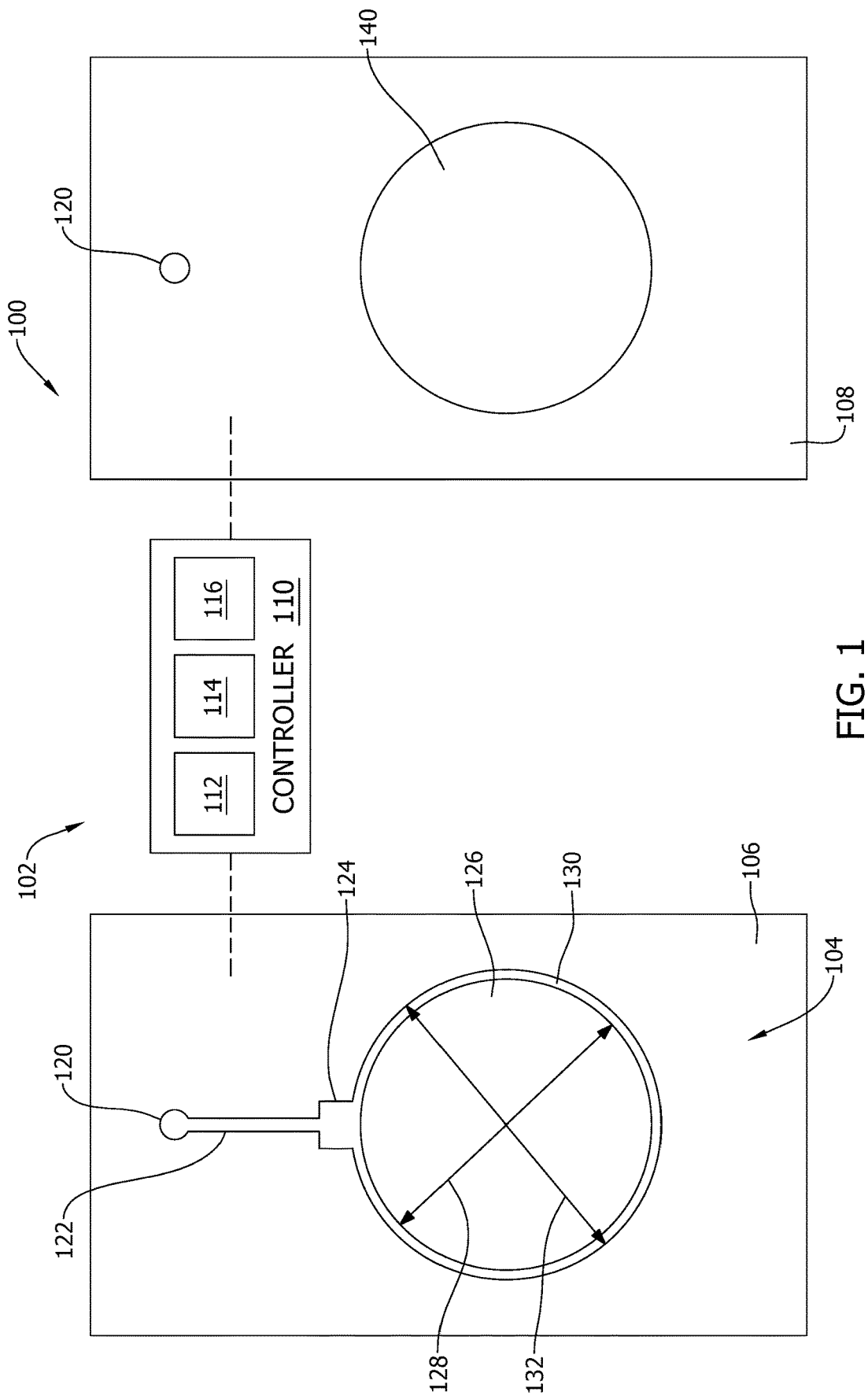
FIG. 1 depicts an exemplary co-molding apparatus in a first molding configuration, in accordance with the present disclosure.

Turning now to FIG. 1, a co-molding apparatus 100 in accordance with the present disclosure is depicted. Co-molding apparatus 100 is configured to facilitate co-molding blanks, such as the exemplary blank 200 shown in FIGS. 2 and 3, which may form an optical lens, such as exemplary optical lenses 302, shown in FIGS. 5A and 5B. In the illustrated embodiment, co-molding apparatus 100 includes a molding station 102 that can be selectively transitioned (e.g., by an operator) between a plurality of molding configurations, each molding configuration corresponding to a respective mold to form a respective discrete injection molded layer. FIG. 1 depicts a first molding configuration of molding station 102. The first molding configuration of molding station 102 is used to form a first or base layer of a molded part (e.g., an optical lens). In the first molding configuration, molding station 102 includes a first mold 104 defined by two mold plates 106 and 108.

Co-molding apparatus 100 also includes a controller 110 configured to control a plurality of operations and/or operational parameters of the molding process implemented using co-molding apparatus 100, as described further herein. Controller 110 includes a memory 112, a processor 114, and a user interface 116. In some embodiments, controller 110 is implemented as a computer (e.g., a desktop computer, laptop computer, tablet, smart phone, etc.). In other embodiments, controller 110 is implemented as a specially configured computing device designed, constructed, and/or implemented specifically for controlling operations of co-molding apparatus 100. Any step or process described herein may be implemented automatically using controller 110 (e.g., according to programmed timing parameters and/or other programmed operational parameters), using controller 110 in response to instruction from a human operator (e.g., in response to user interaction with user interface 116), and/or manually, by the human operator (e.g., by the human operator manipulating one or more components of co-molding apparatus).

To initiate a first injection molding step, mold plates 106, 108 are brought into face-to-face contact with one another, and a first material (not shown) is injected into first mold 104, between mold plates 106, 108.

In particular, first mold 104 includes a sprue channel 120 through which the first material is injected, during the first injection molding step, to form a first molded layer. Thereafter, with respect to a fluid flow path of the first material, a plurality of channels are formed in first mold plate 106. Specifically, a runner channel 122 extends from sprue channel 120 to a gate channel 124, from which a concave body channel 126 extends. Concave body channel 126 is generally circular and has a first diameter 128. An overmold flange channel 130 extends circumferentially around concave body channel 126 and has a second diameter 132 that is greater than first diameter 128. Second mold plate 108 includes a portion of sprue channel 120 and a convex body protrusion 140 corresponding to concave body channel 126.

The first injection molding step is considered complete when the first material has filled first mold 104 and has cooled, or has at least partially cooled (e.g., has cooled to a point where the first molded layer formed by the first material will not deform when removed from first mold 104). Mold plates 106, 108 are separated from one another to expose the formed first molded part including a first molded layer. The first molded part is ejected from first mold 104. This process may be repeated any number of times, to form any number of first molded parts.

Figure 3:
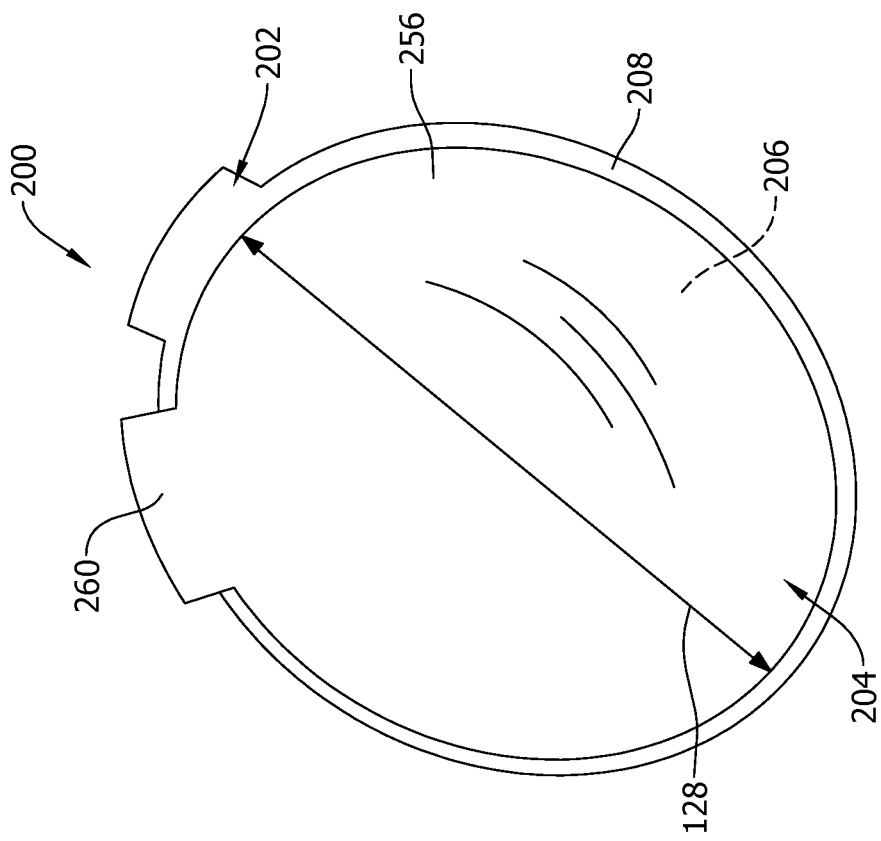
FIGS. 2 and 3 depict an exemplary co-molded blank in accordance with the present disclosure.
Figure 2:
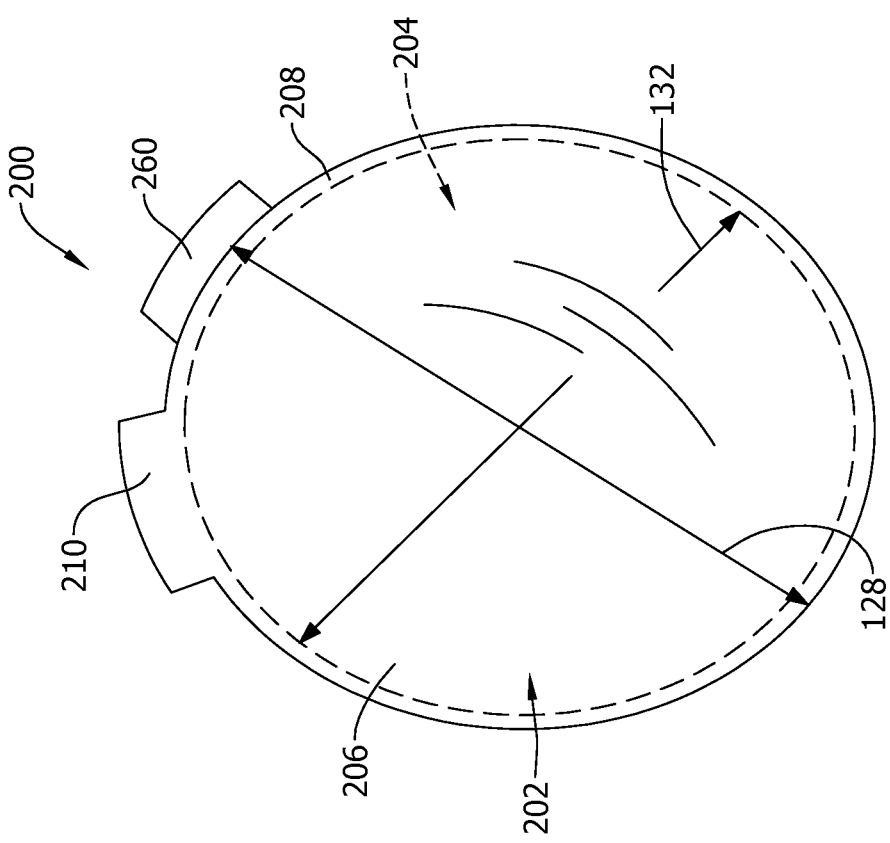

Turning to FIGS. 2 and 3, an exemplary co-molded blank 200 formed from a first molded layer 202 and a second molded layer 204, using co-molding apparatus 100, is shown. First molded layer 202 includes a body 206, formed at concave body channel 126 of first mold 104. Body 206 forms a portion of co-molded blank 200 that will subsequently be used to form the resultant co-molded part (e.g., an optical lens, as described further herein). Body 206 has first diameter 128. An overmold flange 208, formed at overmold flange channel 130, extends circumferentially from body 206 and has second diameter 132. A gate 210, formed from gate channel 124, extends radially from body 206.

Figure 4:
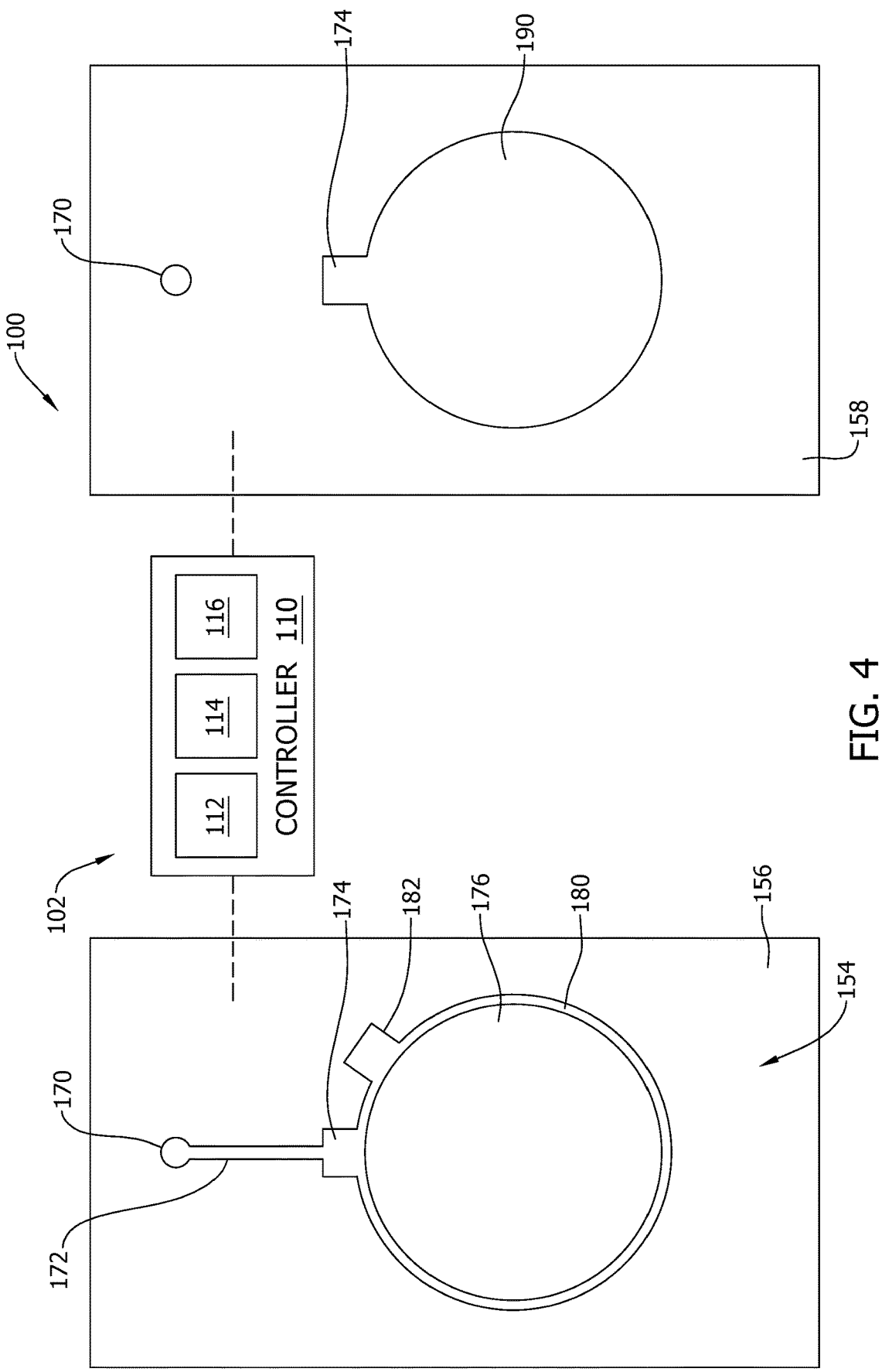
FIG. 4 depicts the co-molding apparatus shown in shown in FIG. 1 in a second molding configuration.

Co-molding apparatus 100 is then transitioned to a second molding configuration, as shown in FIG. 4. In the second molding configuration, co-molding apparatus 100 is used to form a second molded layer adjacent to the first molded layer (e.g., first molded layer 202). More specifically, mold plates 106, 108 are replaced with alternative mold plates, which are coupled to co-molding apparatus 100 to form a second mold.

As shown in FIG. 4, an exemplary second mold 154 is defined by two mold plates 156, 158. In this embodiment, second mold 154 includes a sprue channel 170 through which a second material is injected, during a second injection molding step, to form a second molded layer. Thereafter, with respect to a fluid flow path of the second material, a plurality of channels are formed in first mold plate 156. Specifically, a runner channel 172 extends from sprue channel 170 to a gate channel 174, from which a concave body channel 176 extends. Concave body channel 176 is generally circular. An overmold flange channel 180 extends circumferentially around concave body channel 176. A second gate channel 182 extends radially from concave body channel 176 and/or overmold flange channel 180. Second mold plate 158 includes a portion of sprue channel 170, a portion of gate channel 174, and a convex body protrusion 190 corresponding to concave body channel 176.

As part of a second injection molding step, the first molded part (e.g., a first molded part including first formed layer 202) is placed into second mold 154. The first molded part may include one or more features that engage with the second mold to ensure precise placement of the first molded part within second mold 154. For example, in the exemplary embodiment, gate 210 is aligned with gate channel 174 in first mold plate 156, to precisely position first molded layer 202 within second mold 154. Moreover, overmold flange 208 is positioned within overmold flange channel 180 of first mold plate 156.

Thereafter, mold plates 156, 158 are brought into contact with each other, and a second material (not shown) is injected into second mold 154. For example, the second material is injected into sprue channel 170 corresponding to second mold 154. The second material flows against or along at least a portion of the first molded part (e.g., first formed layer 202), to form a second layer against the first layer. Therefore, in the exemplary embodiment, the first molded part may be understood to form or define a part of second mold 154.

The second injection molding step is considered complete when the second material has filled second mold 154 and has cooled, or has at least partially cooled (e.g., has cooled to a point where the second molded layer formed by the second material will not deform when removed from second mold 154). Mold plates 156, 158 forming second mold 154 are separated from one another to expose the formed second molded part (e.g., co-molded blank 200), which includes the first and second injection molded layers (e.g., first and second molded layers 202, 204). This process may be repeated any number of times, to form any number of second molded parts. Moreover, additional injection molding steps can be added and repeated, to form subsequent molded parts with any number of injection molded layers.

Turning again to FIGS. 2 and 3, second molded layer 204 is formed against first molded layer 202 using co-molded apparatus 100. That is, after first molded layer 202 is formed and co-molded apparatus 100 is transitioned to the second molding configuration, first molded layer 202 is returned to co-molding apparatus 100, and a second material is injected into co-molded apparatus 100. The second material flows through second mold 154, against first molded layer 202, to form co-molded blank 200 including both first molded layer 202 and second molded layer 204.

In the exemplary embodiment, second molded layer 204 includes a body 256 with a shape complementary to the shape (e.g., curvature) of body 206 of first molded layer 202. Body 256 also has first diameter 128. In the exemplary embodiment, overmold flange 208 of first molded layer 202 seals the edge around body 206 of first molded layer 202 during molding of second molded layer 204, to limit the flow of the second material such that body 256 of second molded layer 204 does not extend beyond first diameter 128. Second molded layer 204 also includes a gate 260, which is formed from gate channel 174 in second mold 154, and which extends radially from body 256.

Figure 5B:
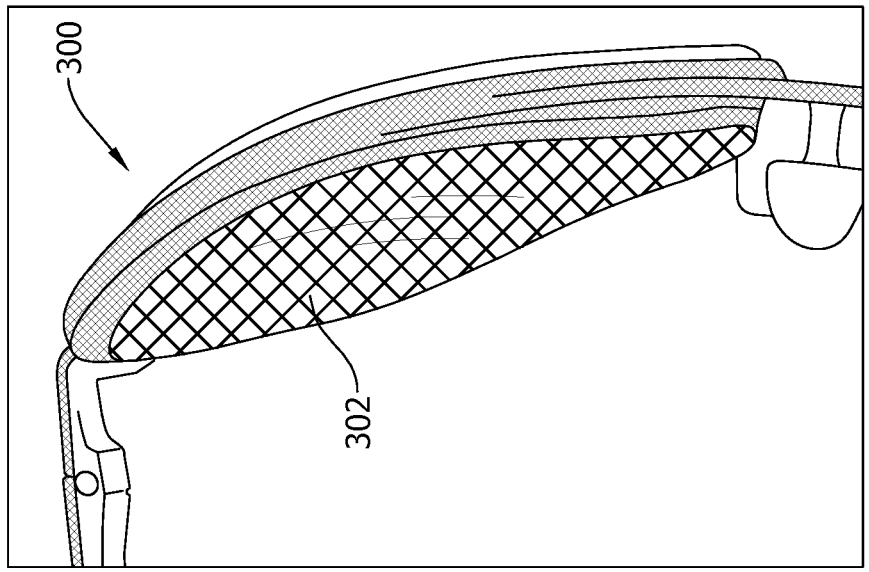
FIGS. 5A and 5B depict an optical lens formed from a co-molded blank in accordance with the present disclosure.
Figure 5A:
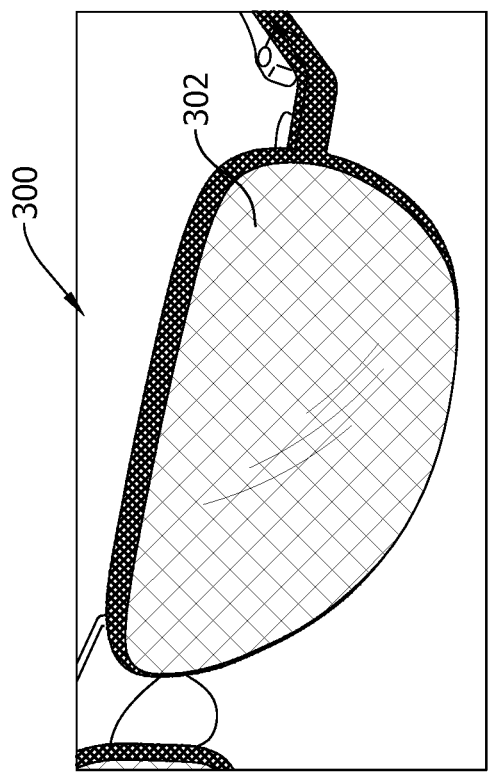

FIGS. 5A and 5B depict an eyeglass apparatus 300 including an exemplary optical lens 302 formed from co-molded blank 200. In particular, FIG. 5A is a front perspective view, and FIG. 5B is a top perspective view of eyeglass apparatus 300. Co-molded blank 200 is cut (e.g., die-cut, laser-cut, cut via water jet, etc.), routed, milled, ground, machined, and/or otherwise modified to form optical lens 302. The process to form optical lens 302 from co-molded blank 200 may be fully automated, such as a computer numerical control (CNC) process implemented using controller 110 or one or more other computing device(s). Alternatively, such a process may semi-automated or manual. Moreover, this process may be implemented using a one- to two-axis rotating pattern following, or an up to six-axis CNC milling operation. Optical lens 302 includes two complementary layers, formed from the co-molded first and second layers 202, 204.

FIG. 6 depicts another exemplary co-molded blank 400 that may be formed using co-molding apparatus 100. In this embodiment, co-molded blank 400 is formed from a first molded layer 402 and a second molded layer 404. First molded layer 402 is formed in a first molding step and includes a body 406. A gate 410, a runner 412, and a sprue 414 extend in sequence from a top edge of body 406. Gate 410, runner 412, and/or sprue 414 may be used to precisely position first molded layer 402 in a second mold prior to a second molding step. Second molded layer 404 is formed against at least a portion of first molded layer 402 in the second molding step. Second molded layer 404 includes a body 456 having a shape (e.g., curvature) complementary to body 406 of first molded layer 402. Co-molded blank 400 may be cut, ground, and/or otherwise modified to form a single-piece optical lens for another exemplary eyeglass apparatus (not shown).

Figure 7:
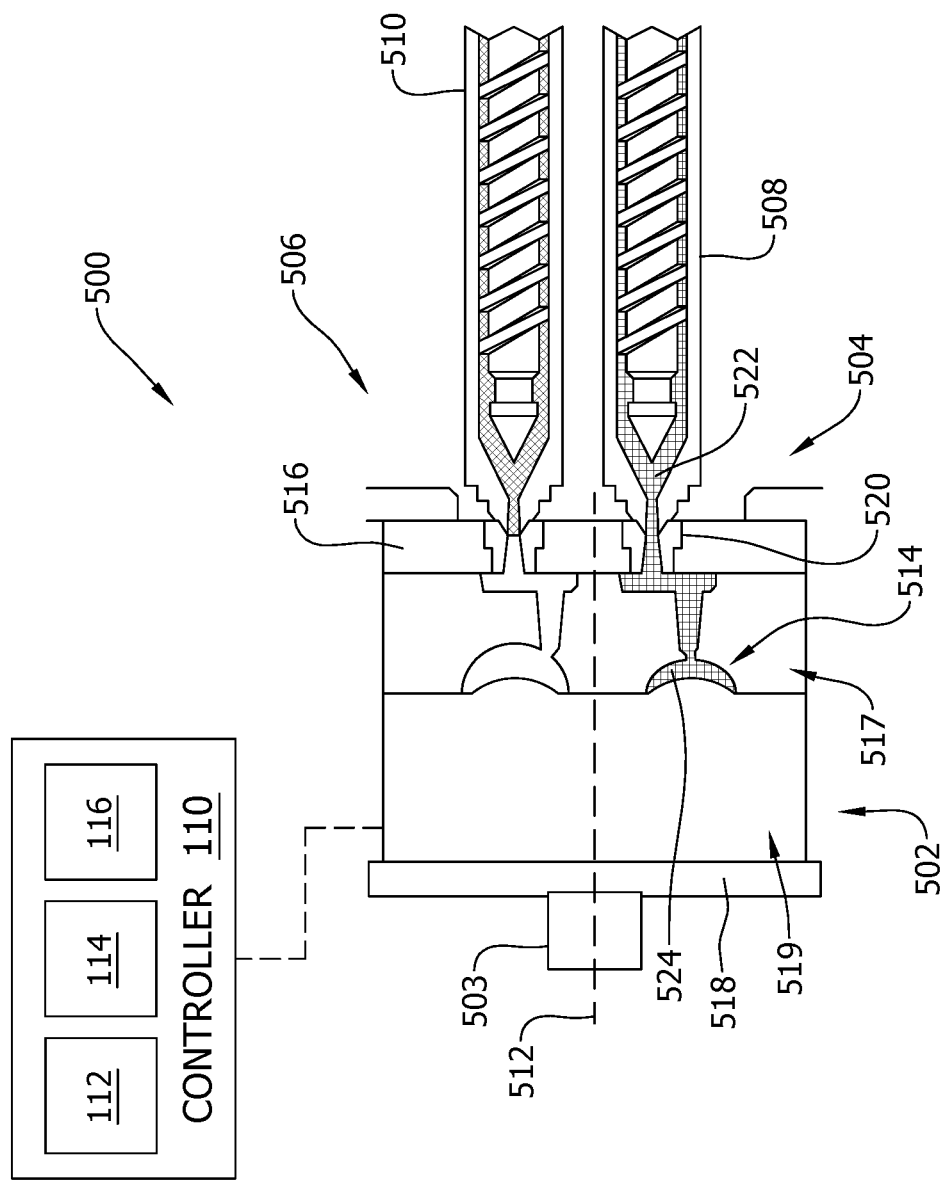
FIGS. 7 and 8 are schematic diagrams of another co-molding apparatus in accordance with the present disclosure.
Figure 8:
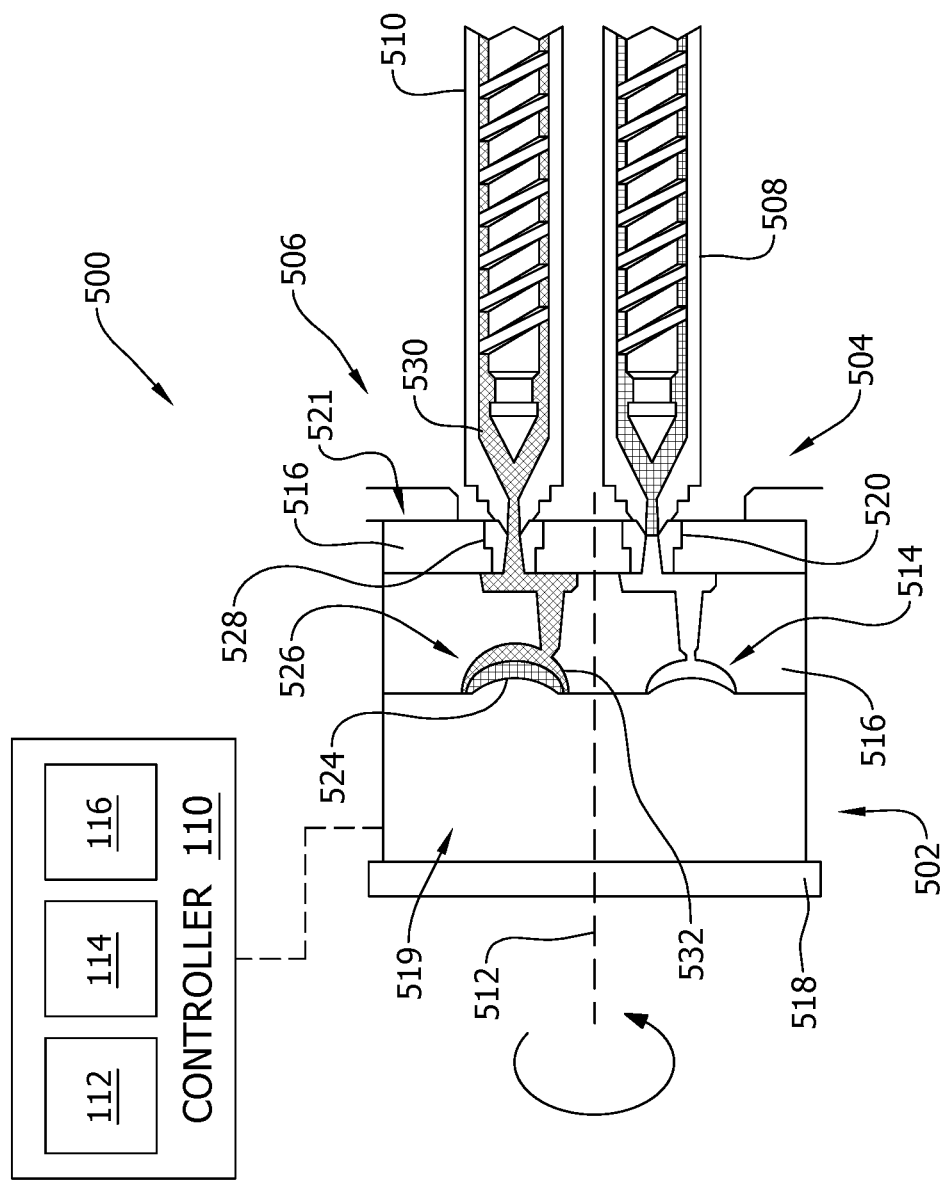

Turning now to FIGS. 7 and 8, another exemplary co-molding apparatus 500 in accordance with the present disclosure is schematically depicted. Like co-molding apparatus 100 (shown in FIGS. 1 and 4), co-molding apparatus 500 is configured to facilitate co-molding blanks, such as the exemplary blanks 200 or 400 shown in FIGS. 3, 4, and 6, which may form an optical lens, such as exemplary optical lenses 302 shown in FIGS. 5A and 5B. Co-molding apparatus 500 includes a head 502 having two molding stations, specifically a first molding station 504 and a second molding station 506, and an actuator 503. First molding station 504 includes a first injection nozzle 508, and second molding station 506 includes a second injection nozzle 510. First molding station 504 is used to form a first or base layer of a molded part (e.g., an optical lens), and second molding station 506 is used to form a second layer against at least a portion of the first layer. In the exemplary embodiment, first and second molding stations 504, 506 are located opposite to one another, with respect to an axis 512 of head 502. For example, second molding station 506 is vertically above (or below) first molding station 504. Alternatively, second molding station 506 is horizontally beside first molding station 504. First and second molding stations 504, 506 may have still other relative orientations.

In the exemplary embodiment, a first mold 514 is located within first molding station 504 and is defined by two mold plates 516 and 518 of head 502. More specifically, as shown in FIG. 7, first mold 514 is formed between a first portion 517 of (first) mold plate 516 and a first portion 519 of (second) mold plate 518. Actuator 503 is coupled to second mold plate 518. A first gate 520 of first mold 514 is aligned with first injection nozzle 508. To initiate a first injection molding step, mold plates 516, 518 are brought into face-to-face contact with one another. A first material 522 is injected from first injection nozzle 508 into first mold 514, between mold plates 516, 518. The first injection molding step is considered complete when first material 522 has filled first mold 514 and has cooled, or has at least partially cooled, to form a first formed layer 524.

After the cooling of first formed layer 524, second mold plate 518 is separated from first mold plate 516 (e.g., using actuator 503), with first formed layer 524 coupled to first portion 519 of second mold plate 518. For example, second mold plate 518 is translated along axis 512 away from first mold plate 516 (e.g., using actuator 503). Thereafter, second mold plate 518, with first formed layer 524 coupled thereto, is rotated about axis 512 (e.g., using actuator 503). Thereby, first formed layer 524 is rotated into second molding station 506, as shown in FIG. 8. More specifically, first formed layer 524 is rotated into a second mold 528, formed between a second section 521 of first mold plate 516 and first section 519 of second mold plate 518 within second molding station 504. A second gate 526 of second mold 528 is aligned with second injection nozzle 510.

To initiate a second injection molding step, mold plates 516, 518 are brought into face-to-face contact with one another. A second material 530 is injected from second injection nozzle 510 into second mold 528, between mold plates 516, 518 and against first formed layer 524. The second injection molding step is considered complete when second material 530 has filled second mold 528 and has cooled, or has at least partially cooled, to form a second formed layer 532 that overlays at least a portion of first formed layer 524. Mold plates 516, 518 are separated, and a formed co-molded part (not shown; e.g., blank 200 or blank 400) including first formed layer 524 and second formed layer 532 is withdrawn therefrom.

In the exemplary embodiment, first and second molding stations 504, 506 are rotationally separated by about 180°. Stated differently, second mold plate 518 is rotated about axis 512 by about 180° to move first formed layer 524 in from first molding station 504 to second molding station 506. It should be readily understood that first and second molding stations 504, 506 may be rotationally separated by any other amount or angle; that is, second mold plate 518 may be rotated about axis 512 by any suitable amount to move first formed layer 524 from first molding station 504 to second molding station 506. Moreover, it should be readily understood that co-molding apparatus 500 may include any number of molding stations separated by any suitable angular displacement without departing from the scope of the present disclosure. For example, co-molding apparatus 500 may include three or more molding stations, to form a molded part with a corresponding three or more layers. As another example, co-molding apparatus 500 may include one or more duplicate pairs of corresponding first and second molding stations 504, 506 in a circumferential path around head 502, such that multiple two-layer co-molded parts may be formed simultaneously.

Using a rotating mold, such as in co-molding apparatus 500, may facilitate improved co-molding over systems requiring manual transfer of molded layers, which may experience significant handling and thermal cycling. Accordingly, such co-molding apparatuses may produce co-molded parts with reduced contamination and/or experiencing lower mechanical stress.

More generally, using co-molding methods and apparatuses to form co-molded parts facilitates reducing overall molding cycle times for relatively thick molded parts, in particular where such molded parts are relatively easily sub-divided into multiple layers that can be sequentially formed/co-molded. For example, co-molding a part in two sequential layers may reduce cooling time by up to 10%, compared to the cooling time for a single-layer molded part of a same thickness; co-molding a part in three sequential layers may reduce cooling time by 10-20%; and co-molding a part in two steps, with two outer layers simultaneously formed on either side of a molded first, inner layer, may reduce cooling time by greater than 20% (e.g., up to about 35%).

It should be readily recognized that the co-molding apparatuses and methods described herein are suitable for forming co-molded parts with precisely controllable features in each molded layer. The specific mold plates used to form each layer can be precisely designed for molded layers with desired shapes, relative orientations, dimensions (e.g., thickness, length, width, diameter, etc.), and the like, which may vary for each layer and/or within a particular layer. Therefore, these co-molding methods and apparatuses can be implemented to form virtually infinite variations of co-molded parts. Moreover, although the exemplary embodiment of the co-molded part to be formed using these methods and systems is described as a blank for an optical lens, these methods and systems may be used to form any suitable co-molded part.

Like co-molding apparatus 100, co-molding apparatus 500 includes controller 110, which includes memory 112, processor 114, and user interface 116. In the exemplary embodiment, executable instructions are stored in memory 112. In the illustrated embodiment, controller 110 performs one or more operations described herein by programming processor 114. For example, processor 114 may be programmed by encoding an operation as one or more executable instructions and by providing the executable instructions in memory 112. Memory 112 is also configured to store additional and/or alternative data, including, for example, operational parameters of co-molding apparatus 100 and/or 500.

Processor 114 may include one or more processing units (e.g., in a multi-core configuration). Further, processor 114 may be implemented using one or more heterogeneous processor systems in which a main processor is present with secondary processors on a single chip. In another illustrative example, processor 114 may be a symmetric multi-processor system containing multiple processors of the same type. Further, processor 114 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the illustrated embodiment, memory 112 is one or more devices that enable information such as executable instructions (e.g., instructions for performing method 1400, shown in FIG. 17) and/or other data to be stored and retrieved. Memory 112 may include one or more (non-transitory) computer readable media, such as, without limitation, dynamic random access memory (DRAM), read-only memory (ROM), electrically erasable programmable read-only memory (EEPROM), static random access memory (SRAM), a solid state disk, and/or a hard disk. Memory 112 may be configured to store, without limitation, application source code, application object code, source code portions of interest, object code portions of interest, configuration data, execution events, and/or any other type of data.

In one exemplary embodiment, controller 110 further includes user interface 116 for presenting information to and/or receiving information from a user (e.g., an operator of co-molding apparatus 100 and/or 500). User interface 116 may, for example, be any component capable of converting and conveying electronic information to the user. In some embodiments, user interface 116 includes an output device (not shown), such as a display device (e.g., a cathode ray tube (CRT), liquid crystal display (LCD), light emitting diode (LED) display, or "electronic ink" display) or an audio output device (e.g., a speaker or headphones). Additionally, user interface 116 may include an input device, for example, a keyboard, a pointing device, a mouse, a stylus, a touch sensitive panel (e.g., a touch pad or a touch screen), and the like. A single component such as a touch screen may function as both an output device and an input device.

It is recognized that the co-molding methods and apparatuses described herein may be implemented with additional and/or alternative steps or features, such that these methods and apparatuses are usable for many applications of co-molding.

Figure 9:
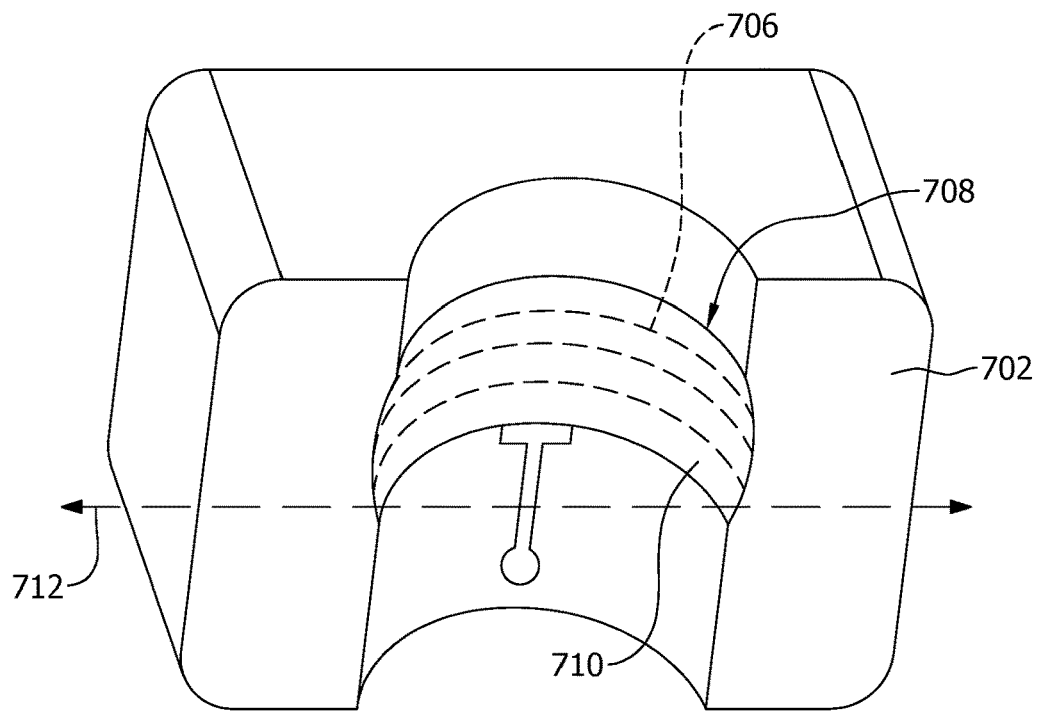
FIGS. 9 and 10 depict first and second mold plates including internal heating elements.
Figure 10:
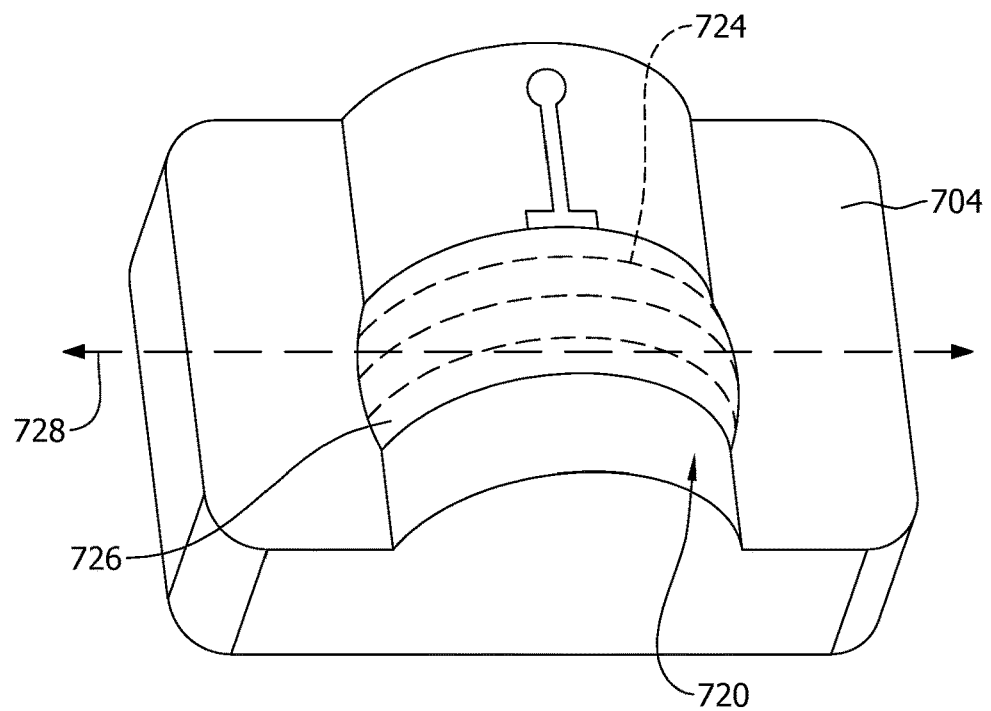

In some embodiments, for example, one or more of the mold plates in a co-molding apparatus may include heating elements that are controllable to precisely control mold surface temperature during and/or between molding cycles, enabling precise control of material flow and, thereby, layer characteristics (e.g., thickness, shape, curvature, etc.). FIGS. 9 and 10 depict one exemplary embodiment of mold plates of a co-molding apparatus (e.g., any of co-molding apparatuses 100, 500, and/or any other co-molding apparatus), the mold plates having heating elements therein. More specifically, FIG. 9 depicts a perspective view of a first mold plate 702, and FIG. 10 depicts a perspective view of a second mold plate 704. First and second mold plates 702, 704 cooperate to form a molding cavity in which layers of molded parts can be formed.

In the exemplary embodiment, first mold plate 702 includes a plurality of first internal heating elements 706. Internal heating elements 706 are arranged adjacent to a molding channel 708 defined in first mold plate 702. More specifically, internal heating elements 706 are complementary to a shape (e.g., a curvature) of a channel wall 710 and are arranged directly against an interior surface of channel wall 710. Thereby, heat generated using internal heating elements 706 is used to warm the mold to control the rate of heat transfer from the molding material in the mold cavity (e.g., between first and second mold plates 702, 704).

In one embodiment, first internal heating elements 706 are arranged in a parallel array and extend parallel to a longitudinal axis 712 of molding channel 708. In other embodiments, there may be more or fewer heating elements 706 arranged in any suitable array (e.g., perpendicular to axis 712, diagonal across channel wall 710, etc.) or in any non-arrayed pattern. In the exemplary embodiment, first internal heating elements 706 are positioned adjacent to an entire molding surface of first mold plate 702; that is, for any surface along which molding material flows, to form a molded layer of a molded or co-molded part, an internal heating element 706 is arranged adjacent to such surfaces within first mold plate 702. In the exemplary embodiment, first internal heating elements 706 are independently controllable, including heating timing and/or temperature thereof. In some embodiments, first internal heating elements 706 are inductive heating elements, and heat is generated in the mold material using heating elements 706 via AC-induced eddy currents; but it should be readily understood that any heating element suitable to function as described herein may be implemented.

Second mold plate 704 includes a molding protrusion 720 complementary to a shape (e.g., curvature) of molding channel 708. Second mold plate 704 also includes a plurality of second internal heating elements 724. Second internal heating elements 724 are arranged adjacent to molding protrusion 720. More specifically, these internal heating elements 724 are complementary to a shape (e.g., a curvature) of a protrusion wall 726 and are arranged directly against an interior surface of protrusion wall 726. Thereby, heat generated using second internal heating elements 724 is used to warm the mold to control the rate of heat transfer from the molding material in the mold cavity (e.g., between first and second mold plates 702, 704).

In one embodiment, second internal heating elements 724 are arranged in a parallel array and extend parallel to a longitudinal axis 728 of molding protrusion 720. In other embodiments, there may be more or fewer heating elements 724 arranged in any suitable array (e.g., perpendicular to axis 728, diagonal across protrusion wall 726, etc.) or in any non-arrayed pattern. In the exemplary embodiment, second internal heating elements 724 are positioned adjacent to an entire molding surface of second mold plate 704; that is, for any surface along which molding material flows, to form a molded layer of a molded or co-molded part, an internal heating element 724 is arranged adjacent to such surfaces within second mold plate 704. In the exemplary embodiment, second internal heating elements 724 are independently controllable, including heating timing and/or temperature thereof. Moreover, second internal heating elements 724 are independently controllable from first internal heating elements 706 of first mold plate 702. In some embodiments, second internal heating elements 724 are inductive heating elements, and heat is generated in the mold material using heating elements 724 via AC-induced eddy currents; but it should be readily understood that any heating element suitable to function as described herein may be implemented.

Other areas of a co-molding apparatus may include heating elements of any kind, to control a temperate at other locations within the co-molding apparatus, such as sprues, gates, runners, barrel zones, nozzles, etc.

In the exemplary embodiment, the particular arrangement of first internal heating elements 706 and/or second internal heating elements 724, as well as the control thereof (e.g., timing, temperature, etc.) is selected and implemented based upon a rigorous simulation and analysis process. Simulation and analysis are conducted and iterated to ensure desirable material flow properties and resultant molded layer properties (e.g., shape, curvature, thickness, etc.) for each layer of a co-molded part.

Generally, it is desirable for multi-layer co-molded parts, specifically optical lenses, to have a similar weight to a single-layer optical lens. However, it can be difficult to mold certain materials—including materials with heat-sensitive dyes, ballistic resins, etc.—into optical lenses with the desirable thickness. For instance, simply molding a first layer with half of the normal thickness and a second layer with the other half of the normal thickness is not necessarily possible. Specifically, each layer tends to be slightly thicker than half the normal lens, and the finished co-molded part is significantly thicker/heavier than a standard lens. Using the mold plates with internal heating elements, as provided herein, with advanced temperature controls, facilitates co-molding thinner layers.

It is further contemplated that the co-molding methods and apparatuses described herein may be advantageously implemented to co-mold materials with different physical and/or optical properties.

Figure 11B:
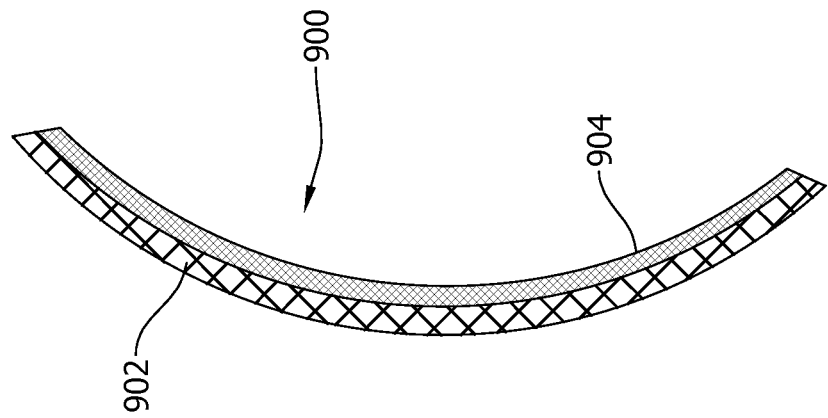
FIGS. 11A and 11B show perspective and side views of an exemplary sectioned co-molded blank formed from co-molded layers with different dyes.
Figure 11A:
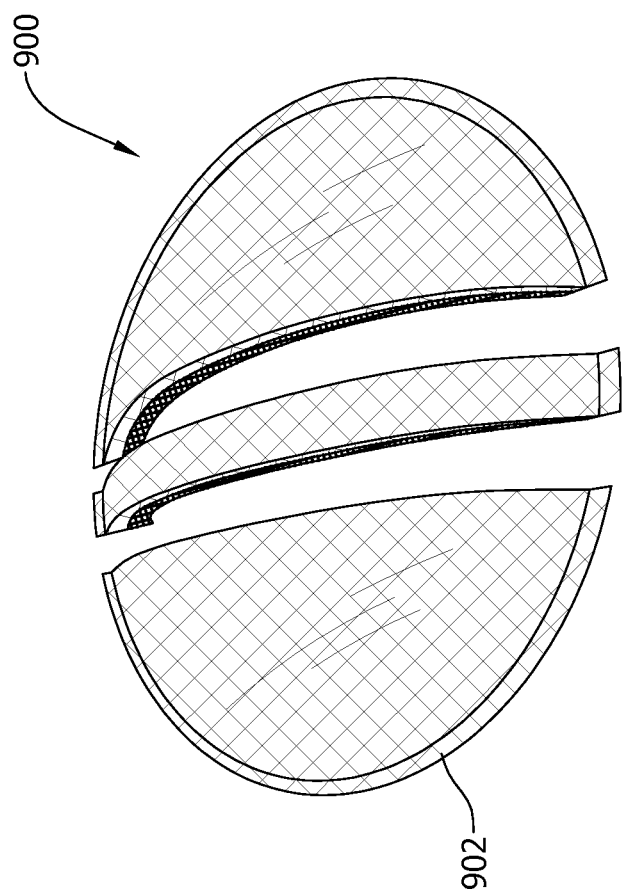

Turning now to FIGS. 11A and 11B, a co-molded blank 900 is depicted. FIG. 15A is a perspective view of a sectioned co-molded blank 900, and FIG. 15B is a side sectional view of co-molded blank 900. In some embodiments, co-molded blank 900 is used to form an optical lens. In the exemplary embodiment, co-molded blank 900 includes a first layer 902 and a second layer 904. First and second layers 902, 904 are formed from dyed materials. Dyes may have various advantageous properties for an optical lens, such as for absorbing light of particular wavelengths or offering protection against projectiles or chemicals. However, certain dyes react poorly with one another, and, therefore, such dyes cannot be used together in a conventional optical lens.

Using the co-molding methods of the present disclosure, an optical lens having layers 902, 904 with non-compatible dyes is realized. In particular, the non-compatible dyes are separated into the discrete layers 902, 904 of co-molded blank 900, which eliminates the poor reactivity of the dyes with one another while enabling the overall blank 900 (and the optical lens formed therefrom) to incorporate the advantageous properties of both dyes.

It is further contemplated that certain (outer) layers of a co-molded part may be used to shield other (inner) layers of a co-molded part. Additionally or alternatively, molded layers or other materials may be encapsulated between subsequently molded layers.

As one example, many dyes are degraded by exposure to the sun. Some of these dyes are so sensitive to solar radiation that, to be used in an optical lens, they would need to be incorporated at such high concentrations, to accommodate this degradation, as to render them impractical for use in commercial eyewear.

According to the present disclosure, a first molded layer is formed with a desirable level of a radiation-sensitive dye (e.g., a suitable amount to provide the desired optical or physical properties imparted by the dye). Thereafter, another layer with less solar susceptibility and/or with a protective property is co-molded onto an exterior surface of the first molded layer. It should be readily understood that, in an alternative embodiment, the exterior or protective layer may be formed first, and the interior or more radiation-sensitive layer co-molded onto the protective layer (against at least a portion of the interior surface of the exterior layer). In still another embodiment, a respective protective layer may be co-molded onto each surface of the radiation-susceptible layer. In any of these embodiments, the resultant co-molded part (e.g., optical lens) incorporates the radiation-susceptible dye while preventing significant degradation thereof using the exterior layer.

As another example, many dyes are degraded by exposure to heat. Some of these dyes are so sensitive to thermal degradation that they cannot be utilized for optical lenses (e.g., ballistic lenses) or need to be incorporated into a lens at such a high concentration, to accommodate this thermal degradation, as to render them impractical for use in commercial eyewear.

In accordance with one embodiment of the present disclosure, a first molded layer is formed with a desirable level of a temperature-sensitive dye (e.g., a suitable amount to provide the desired optical or physical properties imparted by the dye). Thereafter, another layer that is less heat-sensitive and/or with a protective property is co-molded onto an exterior surface of the first molded layer. It should be readily understood that, in an alternative embodiment, the exterior or protective layer may be formed first, and the interior or more heat-sensitive layer co-molded onto the protective layer (against at least a portion of the interior surface of the exterior layer). In still another embodiment, a respective protective layer may be co-molded onto each surface of the heat-sensitive layer. In any of these embodiments, the resultant co-molded part (e.g., optical lens) incorporates the heat-susceptible dye while preventing significant degradation thereof using the exterior layer.

Co-molding layers of different materials (e.g., dyes), as described herein, represents an improvement over conventional methods for producing optical lens, including laminating or adhering discrete layers together, or using vacuum deposition techniques to incorporate materials onto a surface of a formed lens. Specifically, lenses formed using these other methods may be less effective at certain angles of incidence and/or may be more vulnerable to damage (e.g., scratching or peeling). Additionally, such lenses may be vulnerable to delamination, layer cracking, outgassing, reduced impact resistance, reduced optical clarity/correctness, increased haze/distortion, increased manufacturing cost, reduced yield, reduced consistency, reduced optical performance, increased complexity of manufacturing (lamination is almost certainly a manual process), and/or increased material (e.g., epoxy) requirements.

As yet another example, some non-ballistic resins can be molded at much lower temperatures than ballistic resins. In accordance with another embodiment of the present disclosure, dyes that would normally be too heat sensitive to be used in single-layer optical lenses are utilized in a first layer of a non-ballistic material. Thereafter, one or more layers formed from a ballistic resin are molded to the first layer, to maintain the overall ballistic performance of the complete lens.

Figures 12A, 12B:
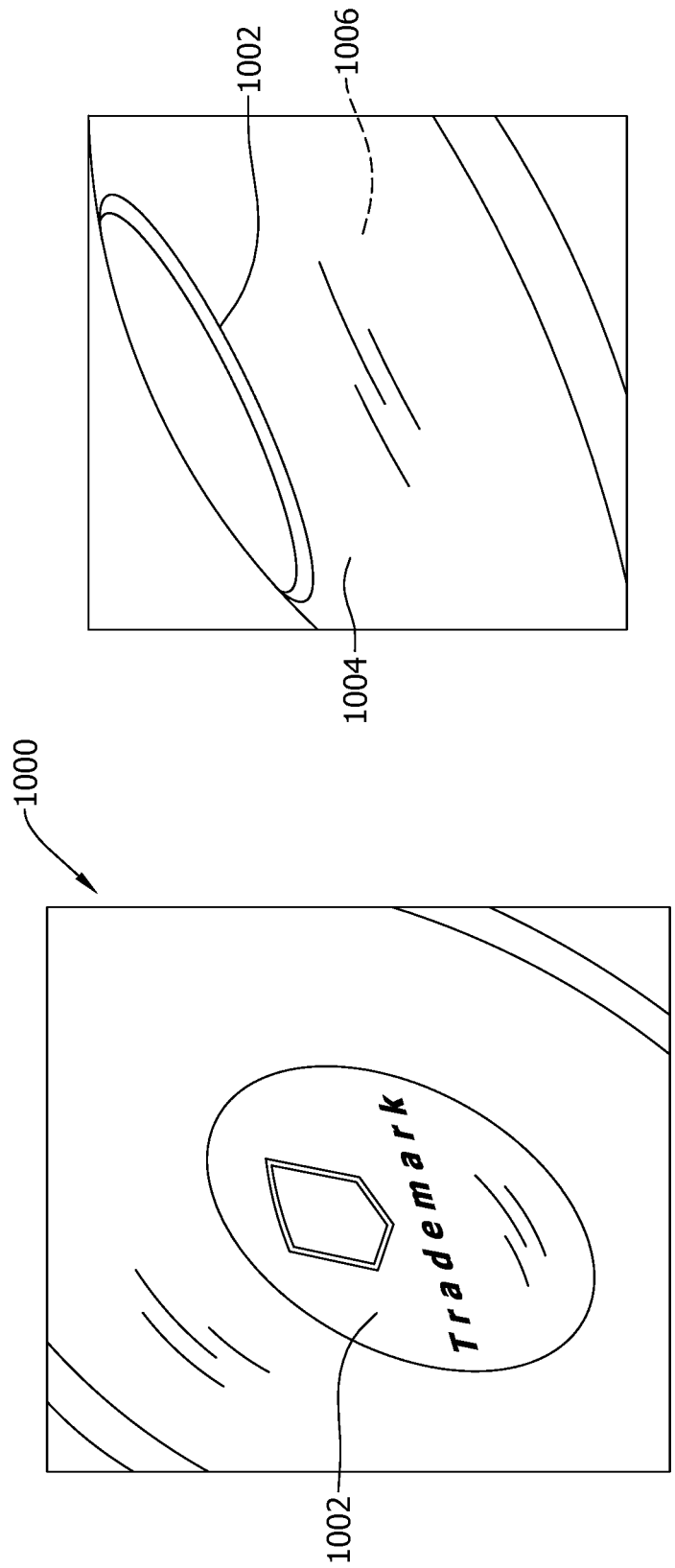
FIGS. 12A and 12B depict a co-molded blank including an intermediate layer encapsulated between two co-molded layers.

In some embodiments of the present disclosure, a first layer is molded, the first layer having any desired properties including those described elsewhere herein. An intermediate material is applied to the surface of the first molded layer, before the second layer is co-molded onto the first molded layer. This intermediate material may be a vacuum-deposited film, a thermo-formed film, other formable material, and/or any other material that can be deposited and shaped appropriately and is compatible with the particular co-molding environment of the two co-molded layers. This intermediate material may be fully encapsulated between the first and second co-molded layers. Alternatively, a portion of the intermediate material may be exposed at the edges of the first and second co-molded layers. In some embodiments, the intermediate material is applied to a bare surface of the first molded layer. Alternatively, the surface of the first molded layer may be first machined or treated with a surface preparation, such as a primer coat or corona discharge. FIGS. 12A and 12B depict a perspective and side view, respectively, of a co-molded blank 1000 (e.g., for an optical lens) including an intermediate printed material 1002 encapsulated between first and second co-molded layers 1004, 1006.

It is contemplated that a discrete layer of intermediate material may be deposited between the co-molded layers, such as a layer of glass between two co-molded layers. In such an embodiment, the co-molded layers may also provide ballistic protection to this intermediate layer. For example, co-molded layers around an intermediate layer of glass (or other material) may contain fragmentation of the intermediate material.

It is also contemplated that the intermediate layer may be embodied as a deposition or coating. For example, a deposit layer, such as a functional and/or aesthetic pattern, may be sputter-deposited onto at least a portion of a first molded layer. A second layer is then co-molded against the first molded layer and the deposit layer, encapsulating the deposit layer between the two co-molded layers.

The co-molding methods and apparatuses of the present disclosure may also be implemented to produce co-molded parts (e.g., blanks, optical lenses, etc.) with variable dye density. The resultant co-molded parts may therefore exhibit dye density gradual gradients or steps.

In particular, as explained briefly above, the thickness of each layer of a multi-layer co-molded part may be varied, based the design of the mold used to form each layer. Additionally or alternatively, one or more layers can be modified (e.g., machined) outside of the mold, after being formed but prior to the application of subsequent layer(s). These variations in thickness may cause differences in optical density based upon the relative concentration of various dyes or in each molded layer.

Figure 14:
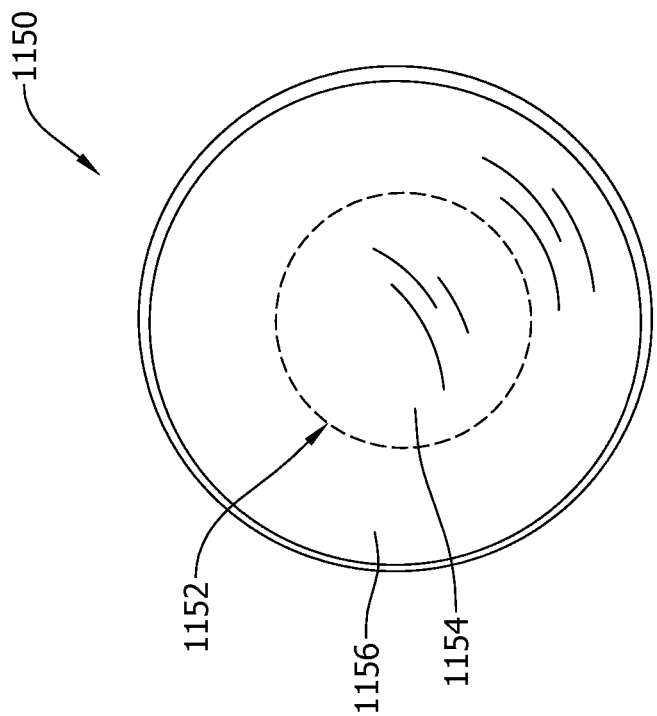
FIG. 14 is a perspective view of a co-molded blank with a gradual dye gradient.
Figure 13:
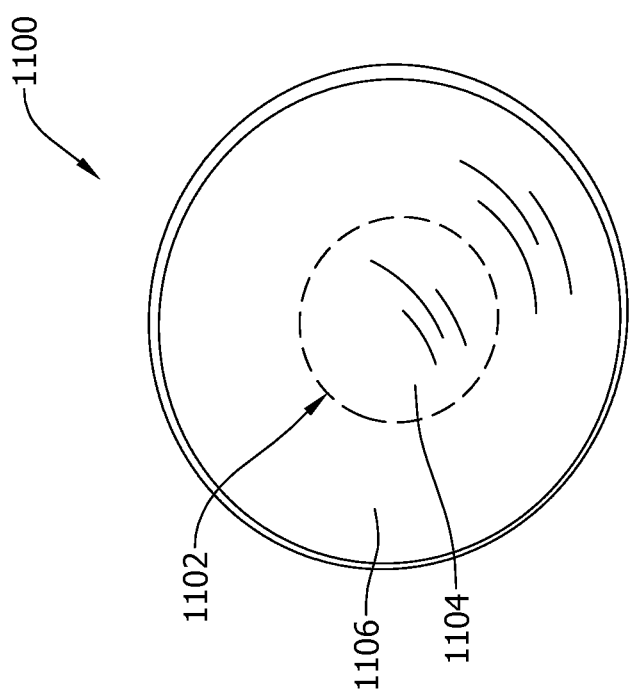
FIG. 13 is a perspective view of a co-molded blank with a steep dye gradient.

FIGS. 13 and 14 illustrate exemplary co-molded blanks (e.g., forming optical lenses) with different optical/dye density gradients. More specifically, FIG. 13 depicts a co-molded blank 1100 with an abrupt discontinuous optical density change 1102, or "step," whereas in FIG. 14, a co-molded blank 1150 demonstrates a more gradual density change 1152, or "gradient," depicted using a finer dashed pattern.

In one embodiment, co-molded blanks 1100 and 1150 are each formed by molding a respective first layer (not specifically shown). In the example shown in FIGS. 13 and 14, the first layer is formed from a substantially clear material. Material from a central region 1104 of the first layer of co-molded blank 1100 is removed; in particular, an edge of central region 1104, once the material is removed, is relatively steep or sharp. In contrast, material from a central region 1154 of the first layer of co-molded blank 1150 is removed, with a more sloped or gradual edge.

Thereafter, a respective second layer is co-molded onto the first layer. In the example shown in FIGS. 13 and 14, the second layer is formed from a dyed material. Accordingly, in a peripheral region 1106 of co-molded blank 1100, the color is lighter than in central region 1104, where there is a greater amount of the dyed material. The difference in color at step 1102 is abrupt. In contrast, in a peripheral region 1156 of co-molded blank 1150, although the color is lighter than in central region 1154, gradient 1152 is much less abrupt between central region 1154 and peripheral region 1156.

It is recognized that the thickness of the various molded layers is substantially infinitely customizable, thereby enabling full customizability of an amount of gradient (e.g., how gradual the color change is). In one particular embodiment, the gradient interface between co-molded layers may be substantially imperceptible. In one practical example, a co-molded optical lens is formed with a peripheral region having a dye that provides optical protection against laser light wavelengths, but that remains optically clear in the central region (e.g., enabling uninhibited use of night-vision goggles), with any desired gradient between these regions.

It is further recognized that, when surfaces of molded layers are machined before subsequent co-molding of additional layers, and materials with similar melt points are utilized in those additional layers, an improved optical interface between the layers is produced via the melting of the machined surface during formation of the subsequent layer on the previous layer, reducing or eliminating the need for the pre-polishing the machined surface. Additionally or alternatively, rather than removing material from the molded first layer, the first layer may be initially molded with a central region having a reduced thickness.

In other embodiments, varying the thickness of adjacent co-molded layers enables forming co-molded optical lenses with desired refractive characteristics. Moreover, these refractive characteristics can be imparted to the optical lens without altering the exterior geometry thereof. In these embodiments, each molded layer is formed with a different optical geometry, to produce a desired refractive function exhibited by the respective layer. Subsequent layers may be co-molded using different materials and/or with other geometries, to result in various refractive functions in a same co-molded optical lens, while maintaining conventional exterior lens geometry.

Figure 15:
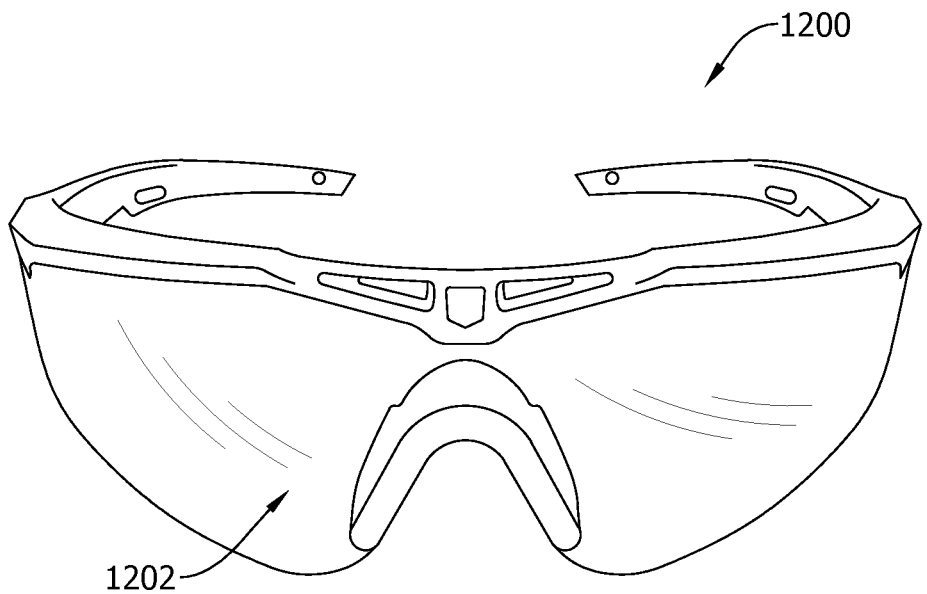
FIG. 15 is an exemplary eyeglass apparatus including a co-molded optical lens with thermally bonded layers.

The present disclosure further involves improved bonding between co-molded layers, compared to conventional adhering or laminating bonding methods. In some embodiments, co-molding induces a desirable thermal bond between adjacent co-molded layers. More specifically, when materials selected for adjacent layers have suitable physical characteristics and are co-molded in subsequent layers under the proper operating conditions (e.g., pressure, temperature, material flow rate, etc.), these layers thermally bond during co-molding. This thermal bond is optically transparent, such that no detriment to the practical usability is exhibited. Moreover, in embodiments including polycarbonate and certain acrylics, or other material capable of thermal bonding to one another, it has been found that such a thermal bond enhances ballistic performance of an optical lens formed from such a co-molded part. An exemplary eyeglass apparatus 1200 including a single-piece optical lens 1202 including thermally bonded co-molded layers is illustrated in FIG. 15.

In other embodiments, in which no thermal or chemical bond is formed between co-molded layers, the resulting layers may be afterwards separated from one another. These co-molded but separable layers have complementary facing surfaces that match topology much more accurately than can be achieved through standard injection molding of each layer separately. These matched surfaces can serve a number of important roles, such as creating precision gaps necessary for the production of liquid crystal displays or shutters between adjacent molded layers.

Figure 16:
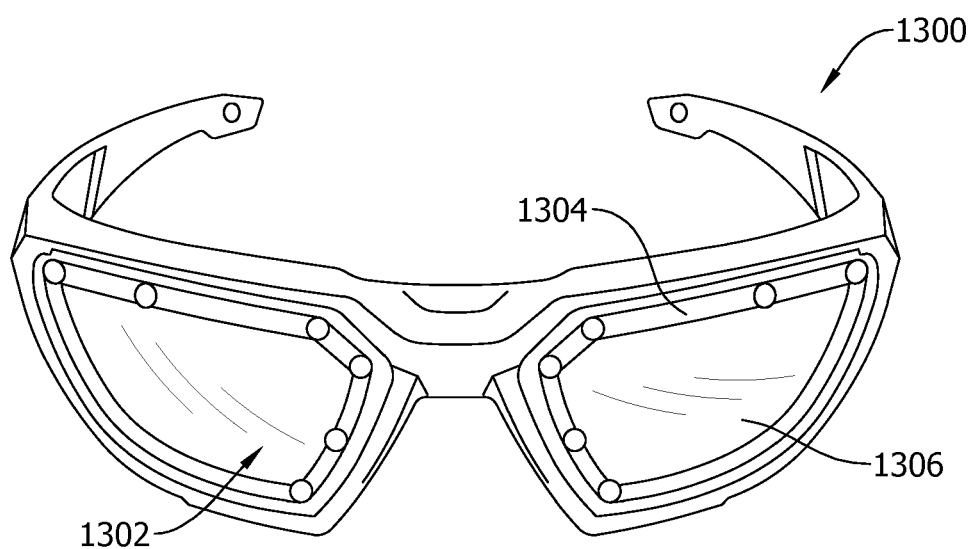
FIG. 16 is an exemplary eyeglass apparatus including co-molded optical lenses with mechanically bonded layers.

However, in some embodiments where no thermal or chemical bond is formed between co-molded layers, enhanced ballistic performance of the co-molded part may be achieved with additional mechanical bonding of the co-molded layers. In some embodiments, polycarbonate layers are co-molded with nylon material and/or other resin layers formed from materials resist bonding to polycarbonate when using typical co-mold operating parameters associated with polycarbonate materials. In such embodiments, a mechanical (e.g., friction-based) bond between the adjacent layers is formed. For example, a bond area is formed in a first molded layer, such as by initially molding the first molded layer with bonding geometry (e.g., trenches, through-holes, and the like), or machining these features into an already-formed first molded layer. Thereafter, the second molded layer is formed on the first molded layer, and the material forming the second layer flows into the bonding geometry. In some such embodiments, the mechanical bond is formed around a periphery of the adjacent layers and penetrates through the co-molded layers. FIG. 16 depicts an exemplary eyeglass apparatus 1300 with optical lenses 1302 formed from such mechanically bonded co-molded layers. Optical lenses 1302 include a peripheral bond region 1304 and a central region 1306 through which a user sees. The mechanical bond in peripheral bond region 1304 ensures an optically clear vision area in central region 1306 of optical lenses 1302. Notably, central region 1306 remains unbonded but optical lenses 1302 still exhibit improved ballistic performance.

Figure 17:
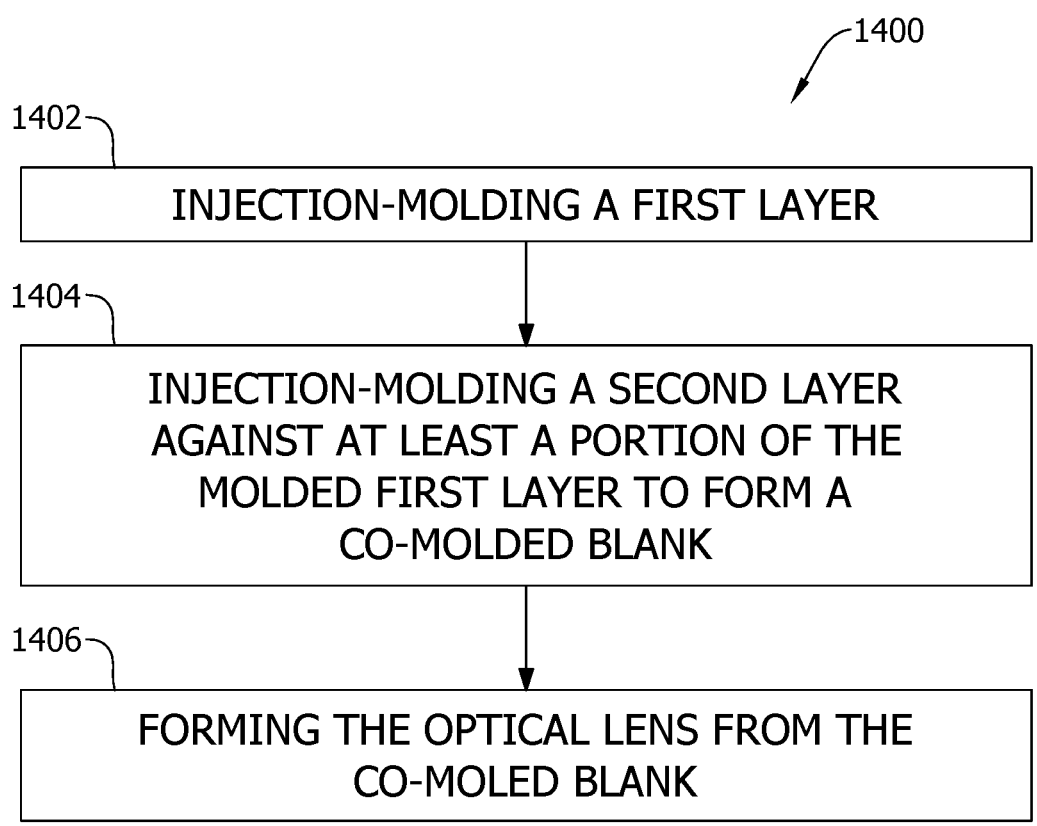
FIG. 17 is a flow diagram of an exemplary method of forming a co-molded optical lens.

Turning now to FIG. 17, a flow diagram of an exemplary method 1400 of co-molding an optical lens, in accordance with the present disclosure, is illustrated. One or more steps of method 1400 may be automated, for example, using controller 110 as described herein. Additionally or alternatively, one or more steps of method 1400 may be performed manually, for example, by a human operator.

Method 1400 includes injection-molding 1402 a first layer, injection-molding 1404 a second layer against at least a portion of the molded first layer to form a co-molded blank, and forming 1406 the optical lens from the co-molded blank.

Method 1400 may include fewer, additional, and/or alternative steps, including those described elsewhere herein. For example, in some embodiments, method 1400 includes cooling the first molded layer before injection-molding 1404 the second layer.

In some embodiments, injection-molding 1402 includes injection-molding 1402 the first layer in a first mold, and injection-molding 1404 includes injection-molding 1404 the second layer in a second mold. In some such embodiments, method 1400 further includes removing the molded first layer from the first mold, and inserting the molded first layer into the second mold. In other such embodiments, method 1400 further includes rotating at least a portion of the first mold to form at least a portion of the second mold.

In some embodiments, method 1400 includes heating a least a portion of the first mold during injection-molding 1402. In some embodiments, method 1400 includes heating a least a portion of the second mold during injection-molding 1404.

In some embodiments, injection-molding 1402 includes injection-molding 1402 the first layer from a first material, and injection-molding 1404 includes injection-molding 1404 the second layer from a second material different than the first material. In some such embodiments, injection-molding 1404 the second layer from the second material includes shielding the first material from at least one of heat, radiation, and ballistic projectiles.

In some embodiments, method 1400 includes removing material from a central region of the molded first layer before injection-molding 1404. In some embodiments, injection-molding 1404 includes creating a thermal bond between the molded first layer and the molded second layer. In other embodiments, method 1400 includes creating a mechanical bond between the molded first layer and the molded second layer.

In some embodiments, method 1400 includes providing an intermediate layer on the molded first layer before injection-molding 1404. In some such embodiments, injection-molding 1404 includes encapsulating the intermediate layer between the molded first layer and the molded second layer.

In some embodiments, forming 1406 includes at least one of routing, milling, die-cutting, laser-cutting, and grinding the co-molded blank to form 1406 the optical lens.

The above-described embodiments provide co-molding methods and apparatuses that are widely applicable to form co-molded parts with virtually any desired characteristics, while facilitating improved optical features and/or ballistic performance. These systems and methods can be implemented with any suitable materials (e.g., plastics or polymers, glass, ceramics, etc.) and with any suitable operating parameters based on the materials used. Exemplary embodiments of co-molding methods, co-molding apparatuses, co-molded parts, and/or optical lenses, as provided herein, are not limited to these specific embodiments described herein, but rather, components of the apparatus may be utilized independently and separately from other components and/or steps described herein. For example, the methods may also be used in combination with other systems requiring co-molding, and are not limited to practice with only the optical lenses as described herein. Rather, the exemplary embodiment can be implemented and utilized in connection with many other applications, equipment, and systems that may benefit from co-molded parts.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of co-molding an optical lens, said method comprising:

injection-molding a first layer in a first mold, wherein the molded first layer includes at least one engagement feature defined by a peripheral edge of the molded first layer and one or more flanges or gates extending radially outward from the peripheral edge; removing the molded first layer from the first mold; inserting the molded first layer into a second mold including engaging the at least one engagement feature with a corresponding location of the second mold; in the second mold, injection-molding a second layer against at least a portion of the molded first layer to form a co-molded blank; and forming the optical lens from the co-molded blank.

2. The method of claim 1, further comprising cooling the molded first layer before said injection-molding the second layer.

3. The method of claim 1, further comprising rotating at least a portion of the first mold to form at least a portion of the second mold.

4. The method of claim 1, further comprising heating a least a portion of the first mold during said injection-molding the first layer or heating at least a portion of the second mold during said injection-molding the second layer to control a thickness of the first layer or the second layer, respectively.

5. The method of claim 1, wherein said injection-molding the first layer comprises injection-molding the first layer from a first material, and
wherein said injection-molding the second layer comprises injection-molding the second layer from a second material different than the first material.

6. The method of claim 5, wherein said injection-molding the second layer from the second material comprises shielding the first material from at least one of heat, radiation, and ballistic projectiles by the second material.

7. The method of claim 1, further comprising removing material from a central region of the molded first layer before said injection-molding the second layer.

8. The method of claim 1, wherein said injection-molding the second layer comprises creating a thermal bond between the molded first layer and the molded second layer.

9. The method of claim 1, further comprising creating a mechanical bond between the molded first layer and the molded second layer along only a perimeter of the optical lens.

10. The method of claim 1, further comprising providing an intermediate non-molded layer on the molded first layer before said injection-molding the second layer, and wherein said injection-molding the second layer comprises encapsulating the intermediate non-molded layer entirely between the molded first layer and the molded second layer.

11. The method of claim 1, wherein said forming the optical lens from the co-molded blank includes at least one of routing or milling the co-molded blank.

12. The method of claim 1, wherein said engaging further comprises engaging the at least one engagement feature against a complementary feature of a plate of the second mold.

* * * * *